US010984756B2

(12) United States Patent
Tall et al.

(10) Patent No.: US 10,984,756 B2
(45) Date of Patent: *Apr. 20, 2021

(54) ADAPTIVE PARAMETERS IN IMAGE REGIONS BASED ON EYE TRACKING INFORMATION

(71) Applicant: Facebook Technologies, LLC, Menlo Park, CA (US)

(72) Inventors: Martin Henrik Tall, Redwood City, CA (US); Javier San Agustin Lopez, Menlo Park, CA (US); Rasmus Dahl, Menlo Park, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/452,940

(22) Filed: Jun. 26, 2019

(65) Prior Publication Data
US 2019/0318708 A1    Oct. 17, 2019

Related U.S. Application Data

(63) Continuation of application No. 15/662,582, filed on Jul. 28, 2017, now Pat. No. 10,373,592.
(Continued)

(51) Int. Cl.
*G09G 5/37* (2006.01)
*G06F 3/147* (2006.01)
(Continued)

(52) U.S. Cl.
CPC ............. *G09G 5/37* (2013.01); *G06F 3/013* (2013.01); *G06F 3/147* (2013.01); *G06T 9/00* (2013.01);
(Continued)

(58) Field of Classification Search
None
See application file for complete search history.

(56) References Cited

U.S. PATENT DOCUMENTS

| 7,075,553 B2 | 7/2006 | Miller et al. |
| 8,020,993 B1 * | 9/2011 | Fram ...................... G06F 3/013 351/200 |

(Continued)

FOREIGN PATENT DOCUMENTS

| EP | 2919098 A1 | 9/2015 |
| JP | H099253 A | 1/1997 |

(Continued)

OTHER PUBLICATIONS

European Patent Office, Extended European Search Report, European Patent Application No. 17837481.5, dated Mar. 28, 2019, 9 pages.
(Continued)

*Primary Examiner* — Saptarshi Mazumder
(74) *Attorney, Agent, or Firm* — Fenwick & West LLP

(57) ABSTRACT

A display system divides a screen into regions and applies a different set of rendering/encoding parameters to each region. The system applies a first set of parameters to a first region that is being viewed by a fovea of an eye of a user. The system may also apply a second set of parameters to a second region that is being viewed by a parafovea of the eye, and apply a third set of parameters to a third region that is being viewed by the area of the eye outside of the parafovea. The first set of parameters are selected to yield relatively high image quality, while the second set of parameters are yield intermediate quality, and the third set of parameters yield lower quality. As a result, the second region and the third region can be rendered, encoded, and transmitted with less computing power and less bandwidth.

20 Claims, 10 Drawing Sheets

Related U.S. Application Data

(60) Provisional application No. 62/369,336, filed on Aug. 1, 2016.

(51) Int. Cl.
   *G09G 5/14* (2006.01)
   *G06F 3/01* (2006.01)
   *G06T 9/00* (2006.01)
   *G09G 5/391* (2006.01)

(52) U.S. Cl.
   CPC .............. *G09G 5/14* (2013.01); *G09G 5/391* (2013.01); *G09G 2320/0693* (2013.01); *G09G 2340/04* (2013.01); *G09G 2340/0407* (2013.01)

(56) References Cited

U.S. PATENT DOCUMENTS

| | | | |
|---|---|---|---|
| 8,696,121 | B1 | 4/2014 | Fram |
| 8,902,970 | B1 | 12/2014 | McCuller |
| 2002/0101612 | A1 | 8/2002 | Lauper et al. |
| 2014/0184475 | A1 | 7/2014 | Tantos et al. |
| 2014/0184550 | A1* | 7/2014 | Hennessey .............. G06F 3/013 345/173 |
| 2014/0211995 | A1* | 7/2014 | Model .................... G06F 3/013 382/103 |
| 2014/0247277 | A1 | 9/2014 | Guenter et al. |
| 2014/0267420 | A1 | 9/2014 | Schowengerdt et al. |
| 2015/0192992 | A1* | 7/2015 | Di Censo ................ G06F 3/013 345/156 |
| 2015/0264299 | A1 | 9/2015 | Leech et al. |
| 2016/0180591 | A1 | 6/2016 | Shiu et al. |
| 2016/0191910 | A1 | 6/2016 | von und zu Liechtenstein |
| 2016/0210503 | A1 | 7/2016 | Yin et al. |
| 2016/0379606 | A1 | 12/2016 | Kollin et al. |
| 2017/0236466 | A1* | 8/2017 | Spitzer ................. G09G 3/2085 345/560 |
| 2017/0287447 | A1* | 10/2017 | Barry ................. G02B 27/0093 |

FOREIGN PATENT DOCUMENTS

| | | |
|---|---|---|
| JP | 2004056335 A | 2/2004 |
| JP | 2009118072 A | 5/2009 |
| JP | 2014508311 A | 4/2014 |
| JP | 2016510525 A | 4/2016 |
| WO | WO 2016/046514 A1 | 3/2016 |

OTHER PUBLICATIONS

Geisler, w. et al., "A Real-Time Foveated Multiresolution System for Low-Bandwidth Video Communication," SPIE Proceedings, vol. 3299, 1998, 13 pages.

Guenter, B. et al., "Foveated 3D Graphics," ACM Transactions on Graphics (TOG), 2012 vol. 31, No. 6, 10 pages.

PCT International Search Report and Written Opinion, PCT Application No. PCT/US2017/044749, dated Nov. 15, 2017, fifteen pages.

Reingold, E.M. et al., "Gaze-Contingent Multiresolutional Displays: An Integrative Review," Human Factors, 2003, vol. 45, No. 2, pp. 307-327.

European Patent Office, Examination Report, European Patent Application No. 17837481.5, dated Feb. 3, 2021, six pages.

Pai, Y. S. et al. "GazeSim: Simulating Foveated Rendering Using Depth in Eye Gaze for VR." SIGGRAPH '16: ACM SIGGRAPH 2016 Posters, Jul. 24-28, 2016, Anaheim, CA, pp. 1-2.

Stengel, M. et al. "An Affordable Solution for Binocular Eye Tracking and Calibration in Head-Mounted Displays." MM '15: Proceedings of the 23$^{rd}$ ACM International Conference on Multimedia, Oct. 26-30, 2015, Brisbane, Australia, pp. 15-24.

Sheikh, H. R. et al. "Real-Time Foveation Techniques for H.263 Video Encoding in Software." 2001 IEEE International Conference on Acoustics, Speech, and Signal Processing. Proceedings, May 7-11, 2001, pp. 1781-1784.

The Japan Patent Office, Office Action, Japanese Patent Application No. 2019-505144, dated Sep. 23, 2020, 12 pages.

\* cited by examiner

ADAPTIVE PARAMETERS IN IMAGE REGIONS BASED ON EYE TRACKING INFORMATION

CROSS REFERENCE TO RELATED APPLICATIONS

This application is a continuation of co-pending U.S. patent application Ser. No. 15/662,582, filed Jul. 28, 2017, which claims the benefit of U.S. Provisional Patent Application No. 62/369,336 filed on Aug. 1, 2016, the content of which is incorporated by reference herein in its entirety.

BACKGROUND

This invention relates generally to eye tracking, and more particularly to the use of adaptive parameters in image regions based on eye tracking information.

Images are rendered, encoded, and displayed to a user in a variety of different contexts. In many situations, the process for rendering, encoding, and transmitting an image for display to a user can consume a large amount of computing resources, especially when the image has a relatively high resolution such as 1080p or 4K or when the image is part of a sequence of frames that make up a video, such as a video file or a scene generated by a game application. This can lead to undesirable side effects such as higher power consumption and longer processing times.

SUMMARY

A display system applies different sets of parameters to different regions of an image. The system receives eye tracking information of one or both eyes of a user viewing a screen of a display screen. The system determines, based on the eye tracking information, a first screen region and a second screen region. In one embodiment, the first screen region is the portion of the screen viewed by the fovea of the user's eye, and the second screen region is the portion of the screen viewed by the portion of the retina outside of the fovea. The system processes an image for display on the screen by applying a first set of parameters to the first image region and applying a second set of parameters to the second image region of the screen. The first image region is the portion of the image that is to be displayed in the first screen region, and the second image region is the portion of the image that is to be displayed in the second image region. The second set of parameters results in a lower image quality than the first set of parameters, but the user is unlikely to perceive the lower image quality because the portion of the retina outside the fovea is less sensitive than the fovea. As a result, the image can be processed with less computing power and less bandwidth.

The display system may be part of a head-mounted display (HMD). The HMD may be part of a virtual reality (VR) system, an augmented reality (AR) system, a mixed reality (MR) system, or some combination thereof.

Figure 1A:
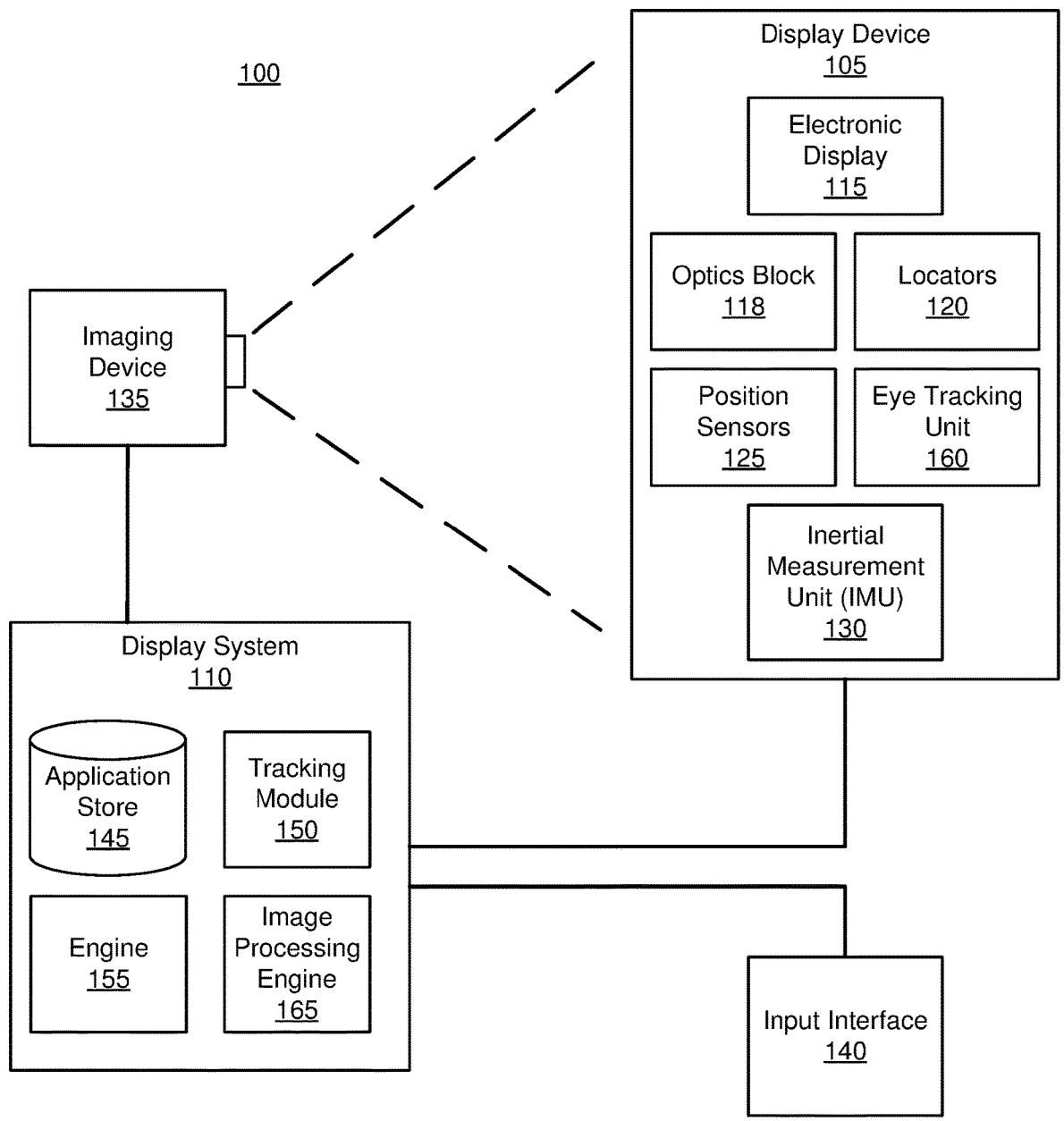
FIG. 1A is a block diagram of a system in which a display device operates, in accordance with an embodiment.

The figures depict various embodiments of the present disclosure for purposes of illustration only. One skilled in the art will readily recognize from the following discussion that alternative embodiments of the structures and methods illustrated herein may be employed without departing from the principles of the disclosure as provided herein.

DETAILED DESCRIPTION

Overview

There are many applications involving users and images in which users gaze at different regions of a screen in succession. Examples include video games, virtual reality scenes, video streams, and augmented reality projections.

When looking at a screen, a user's eye is sensitive to higher resolutions in the screen region around the point of regard. The point of regard is aligned with the fovea, the region of retina that provides the highest visual acuity and where the concentration of cone cells is the highest. In regions of the retina beyond the fovea, sensitivity to resolution is reduced, and visual acuity drops with distance from the fovea. In the parafovea (a ring-shaped region of the eye that circumscribes the fovea), the eye is still sensitive to resolution, but to a lesser extent than in the fovea. In the area outside of the parafovea, the eye is significantly less sensitive to differences in resolution.

In situations where an image being displayed on the screen has a higher resolution, it is typical to render the entire image in the higher resolution, encode the entire image in the higher resolution, and transmit the encoded image using suitably high bandwidth means. But because the eye is relatively insensitive to image resolution in regions outside of the fovea and parafovea, a process in which an entire image is rendered, encoded, and transmitted at a higher resolution can result in an unnecessary use of computing power and bandwidth.

Instead of using a higher resolution for the entire image, a display system divides the screen of a display device into regions and applies a different set of rendering/encoding parameters to each region. For example, the display system identifies a first region of the screen (hereinafter referred to as the fovea region) that is being viewed by the fovea of the user's eye and applies a first set of parameters to the first region. The first set of parameters are selected to yield relatively high image quality. For example, the first set of parameters may specify a relatively high framerate and resolution. Similarly, the display system may identify a second region of the screen (hereinafter referred to as the parafovea region) that is being viewed by the parafovea of the user's eye and apply a second set of parameters to the second region. The display system may further identify a third region of the screen (hereinafter referred to as the outside region) that is being viewed by the area of the user's eye outside of the fovea and parafovea and apply a third set of parameters to the third region. The second set of parameters are selected to yield intermediate image quality (e.g., an intermediate framerate and resolution), and the third set of parameters are selected to yield lower image quality (e.g., a lower framerate and resolution). As a result, the second region and the third region can be rendered, encoded, and transmitted with less computing power and less bandwidth, which reduces the overall amount of computing power and bandwidth used to render, encode, and transmit the image.

The display system identifies the first region and the second region based on eye tracking information received from an eye tracking unit. The display system uses the eye tracking information to determine the point on the screen at which the user is looking (hereinafter referred to as the point of regard). The display system can then determine the boundaries of the fovea region, the parafovea region, and the outside region based on the point of regard. In one embodiment, the fovea region is a circle centered on the point of regard and having a radius of 2.5 degrees of visual angle, and the parafovea region is an annulus centered on the point of regard, with an inner radius of 2.5 degrees of visual angle and an outside radius of 5 degrees of visual angle. The outside region is the portion of the screen beyond the outside radius of the parafovea region.

After determining the boundaries of the screen regions, the display system can adaptively render and encode the image. Furthermore, the display system can receive updated eye tracking information at regular intervals as the user's eyes shift between different positions of the screen, and the display system can recompute the point of regard and the boundaries of the screen regions based on the updated eye tracking information. Thus, to the user, the region of the screen around the point of regard (i.e., the fovea region) will appear to have higher image quality, and this is the region to which the eye is most sensitive to image quality. In the parafovea region, intermediate parameters can be applied without noticeable image degradation, and in the outside region, lower parameters can be applied without noticeable image quality degradation.

Even when a user's eye is moving rapidly across the screen, the eye tracking information can keep up with the changes in gaze position and the updated eye tracking information can be relayed quickly enough to allow adaptive parameters to be applied to the different fovea and parafovea regions of the image. Thus, regardless of where the user looks, the image appears to have high resolution. However, the display system renders and encodes a portion of the image with higher-quality parameters, while the rest of the image is rendered and encoded with intermediate- or lower-quality parameters.

The net effect of applying adaptive parameters based on eye tracking information is to reduce the overall computing power used to render and encode the image data, and to reduce the amount of bandwidth used to transmit the image data for display by a user's display device.

System Overview

FIG. 1A is a block diagram of a system 100 in which a display system 110 operates. The system 100 may operate in a VR system environment, an AR system environment, a MR system environment, or some combination thereof. The system 100 shown by FIG. 1A comprises a display device 105 (e.g., a head-mounted display), an imaging device 135, and an input interface 140 that are each coupled to the display system 110.

While FIG. 1A shows an example system 100 including one display device 105, one imaging device 135, and one input interface 140, in other embodiments any number of these components may be included in the system 100. For example, there may be multiple display devices 105 each having an associated input interface 140 and being monitored by one or more imaging devices 135, with each display device 105, input interface 140, and imaging devices 135 communicating with the display system 110. In alternative configurations, different and/or additional components may be included in the system 100. Similarly, functionality of one or more of the components may be distributed among the components in a different manner than is described here. For example, some or all of the functionality of the display system 110 may be contained within the display device 105.

The display device 105 is a head-mounted display (HMD) that presents content to a user comprising virtual and/or augmented views of a physical, real-world environment with computer-generated elements (e.g., two-dimensional or three-dimensional images, two-dimensional or three-dimensional video, sound, etc.). In some embodiments, audio is presented via an external device (e.g., speakers and/or headphones) that receives audio information from the display device 105, the display system 110, or both, and presents audio data based on the audio information. Some embodiments of the display device 105 are further described below in conjunction with FIG. 2. The display device 105 may comprise one or more rigid bodies, which may be rigidly or non-rigidly coupled to each other. A rigid coupling between rigid bodies causes the coupled rigid bodies to act as a single rigid entity. In contrast, a non-rigid coupling between rigid bodies allows the rigid bodies to move relative to each other. The display device 105 includes an electronic display 115, an optics block 118, one or more locators 120, one or more position sensors 125, an inertial measurement unit (IMU) 130, and an eye tracking unit 160. Some embodiments of the display device 105 have different components than those described here. Similarly, the functionality of various components may be distributed among other components in the system 100 in a different manner than is described here in various embodiments. For example, some of the functions of the eye tracking unit 160 may be performed by the display system 110.

The electronic display 115 (also referred to herein as a screen) displays images to the user in accordance with data received from the display system 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The optics block 118 magnifies image light received from the electronic display 115, corrects optical errors associated with the image light, and the corrected image light is presented to a user of the display device 105. In various embodiments, the optics block 118 includes one or more optical elements. Example optical elements include: an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as partial reflectors or anti-reflective coatings.

Magnification of image light by the optics block 118 allows the electronic display 115 to be physically smaller, weigh less, and consume less power than larger displays. Additionally, magnification may increase a field of view of the displayed content. For example, the field of view of the displayed content is such that the displayed content is presented using almost all (e.g., 110° diagonal), and in some cases all, of the user's field of view. In some embodiments, the optics block 118 is designed so its effective focal length is larger than the spacing to the electronic display 115, which magnifies image light projected by the electronic display 115. Additionally, in some embodiments, the amount of magnification may be adjusted by adding or removing optical elements from the optics block 118.

The optics block 118 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The locators 120 are objects located in specific positions on the display device 105 relative to one another and relative to a specific reference point on the display device 105. A locator 120 may be a light emitting diode (LED), a corner cube reflector, a reflective marker, a type of light source that contrasts with an environment in which the display device 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1700 nm), in the ultraviolet band (10 nm to 380 nm), in some other portion of the electromagnetic spectrum, or in some combination thereof.

In some embodiments, the locators 120 are located beneath an outer surface of the display device 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the display device 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the display device 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the display device 105 relative to an initial position of the display device 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the display device 105 from the sampled data. For example, the IMU 130 integrates the measurement signals received from the accelerometers over time to estimate a velocity vector and integrates the velocity vector over time to determine an estimated position of a reference point on the display device 105. Alternatively, the IMU 130 provides the sampled measurement signals to the display system 110, which determines the fast calibration data. The reference point is a point that may be used to describe the position of the display device 105. While the reference point may generally be defined as a point in space, in practice the reference point is often defined as a point within the display device 105 (e.g., a center of the IMU 130).

The IMU 130 receives one or more calibration parameters from the display system 110. As further discussed below, the one or more calibration parameters are used to maintain tracking of the display device 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The eye tracking unit 160 tracks movement of the user's eye. In general, tracked eye movement can include an angular rotation of the eye, as well as a translation of the eye, a change in the torsion of the eye, or a change in shape of the eye. Angular rotation of the eye is a change in the angular orientation of the eye. The angular orientation of the eye corresponds to a direction of the user's gaze within the display device 105 and is defined herein as the direction of the foveal axis, which is the axis between a fovea (an indentation on the retina of the eye) of the eye and a center of the eye's pupil. In general, when a user's eyes are fixed on a point, the foveal axes of the user's eyes intersect that point. The eye also includes a pupillary axis, which is the axis passing through the center of the pupil, which is perpendicular to the corneal surface. Generally, the pupillary axis does not directly align with the foveal axis. Both the pupillary and foveal axes intersect at the center of the pupil, but the orientation of the foveal axis is offset from the pupillary axis by approximately −1° to 8° laterally and ±4° vertically. Because the foveal axis is defined relative to the fovea, which is located in the back of the eye, detection of the foveal axis may be difficult or impossible when using certain methods of eye tracking. Accordingly, in some embodiments, the eye tracking unit 160 detects an orientation of the pupillary axis and estimates the foveal axis based on the detected pupillary axis. Alternately, the eye tracking unit 160 estimates the foveal axis by directly detecting a location of the fovea or of other features of the eye's retina.

Translation of the eye is a change in the position of the eye relative to the eye socket. In some embodiments, translation of the eye is not directly detected, but is approximated based on a mapping from a detected angular orientation. Translation of the eye corresponding to a change in the eye's position relative to one or more components of the eye tracking unit 160 may also be detected. Translation of the eye relative to one or more components of the eye tracking unit 160 may occur when a position of the display device 105 of a user's head shifts. The eye tracking unit 160 may also detect torsion of the eye, which is rotation of the eye about the pupillary axis. The eye tracking unit 160 may use detected torsion of the eye to estimate orientation of the foveal axis based on a detected pupillary axis. The eye tracking unit 160 may also track a change in the shape of the eye, which may be approximated as a skew, a scaling linear transform, or a twisting distortion (e.g., due to torsional deformation). Based on a combination of the angular orientation of the pupillary axis, the translation of the eye, the torsion of the eye, and the current shape of the eye tracking unit 160 may estimate the foveal axis.

The eye tracking unit 160 uses the tracked eye movement to determine eye tracking information. Eye tracking information describes a position and/or an orientation of an eye of the user. The eye tracking unit 160 may use the determined eye tracking information to further estimate eye tracking values, such as a gaze direction (also referred to a direction of a fovea axis that is an axis that bisects a center of a fovea and a center of an eye's pupil), a gaze position (also referred to as an fixation point where the user is looking), and gaze time (how long the user is looking a particular direction), a vergence angle (an angle between two eyes when the user changes viewing distance and gaze direction), an inter-pupillary distance (IPD, defined as the distance between the center of the pupils of the two eyes) of the user, an identification of the user, an eye's torsional state, eye's shape, some other function based on position of one or both eyes, or some combination thereof. For example, the eye tracking unit 160 can determine IPD by estimating eye position when the user is focused at infinity or, for example, another object far from the user. In another example, the eye tracking unit 160 determines vergence angle by estimating changes of a user's viewing distance and gaze direction. The eye tracking unit 160 is also able to determine the eye's torsional state by estimating eye's rotation about a pupillary axis. In some embodiments, the eye tracking unit 160 is able to determine the foveal axis, the orientation of the foveal axis from a pupillary axis, and a change in the shape of the eye.

The eye tracking unit 160 may include one or more illumination sources, one or more imaging devices, and an eye tracking controller. The illumination source (also referred to as illuminator) illuminates a portion of a user's eye with light. The predetermined illumination power is less than a threshold that causes injury to the eye. The illumination source may be an infrared light source. Examples of infrared light sources include: a laser (e.g., a tunable laser, a continuous wave laser, a pulse laser, other suitable laser emitting infrared light), a light emitted diode (LED), a fiber light source, another other suitable light source emitting infrared and/or visible light, or some combination thereof. In various embodiments, the illumination source may emit visible or near-infrared light. In some embodiments, the light emitted from the one or more illumination sources is a structured light pattern. In some embodiments, a portion of the eye to be illuminated by the illumination source is selected for easy detection, due to an obvious change between the signal from the illuminated portion and other signals surrounding the illuminated portion during eye movement. For example, the illuminated portion may have a maximum contrast (e.g., a position with strongest back-reflection or backscattering from the edge of the user's sclera or cornea surface). The illuminated portion may be located on, for example, an edge of the sclera, surface of the cornea, a limbus (e.g., junction of the cornea and sclera, a junction of the iris and the sclera, a junction of the iris and pupil, or any other suitable junction in the eye).

An imaging device detects reflected and/or scattered light from the illuminated portion of the eye. The imaging device outputs a detection signal proportional to the detected light. The detection signal corresponds to a reflectance of the illuminated portion of the eye which correlates with an apparent contrast change (e.g., a contrast change of corneal reflection) through the illuminated portion of the user's eye 170. In an embodiment, the imaging device comprises a camera configured to capture images of the illuminated portion of the eye. In some embodiments, the detector may be based on single-point detection (e.g., photodiode, balanced/matched photodiodes, or avalanche photodiode, or photomultiplier tube), or based on one or two-dimensional detector arrays (e.g., a camera, linear photodiode array, CCD array, or CMOS array). In some embodiments, the eye tracking unit 160 may include multiple detectors to capture light reflected from one or more illuminated portions of the eye.

The eye tracking unit 160 determines eye tracking information based on captured light (e.g., a captured image) from the one or more imaging devices. In some embodiments, the eye tracking unit 160 may compare captured light information (e.g., reflections of the eye, distortions of a structured light pattern projected onto the eye) with a predetermined lookup table or a predetermined eye model to estimate eye tracking information of the eye. A predetermined lookup table or a predetermined eye model describes the relation between captured light information and eye tracking information. For example, in some embodiments, the eye tracking unit 160 identifies locations of reflections of light from the one or more illumination sources in a captured image of the eye of the user, and determines eye tracking information based on a comparison between shapes and/or locations of the identified reflections and a predetermined lookup table (or a predetermined eye model). Or, in cases where the eye is illuminated with a structured light pattern, the eye tracking unit 160 can detect distortions of the structured light pattern projected onto the eye, and estimate eye tracking information based on a comparison between the detected distortions and the predetermined look-up table (or a predetermined eye model). The eye tracking unit 160 may use eye tracking information to further estimate other eye tracking values, such as a pupillary axis, a gaze angle (e.g., corresponding to a foveal axis), a translation of the eye, a torsion of the eye, and a current shape of the eye. In alternate embodiments, instead of using light reflected from one or both eyes to determine eye tracking information, the eye tracking unit 160 may use some other method of determining eye position, such as ultrasound or radar.

In some embodiments, the eye tracking unit 160 stores a model of the user's eye and uses the model in conjunction with one or more scans of the eye to estimate the current orientation of the eye. The model may be a 3D model of the eye's surface or a 3D volume of a portion of the eye. The model further includes boundaries for different portions of the retina of the eye, including, for example, the fovea, the parafovea, and the perifovea. The boundaries of these portions of the eye may be determined, for example, through the calibration sequence described below. In an embodiment in which both of a user's eyes are scanned, the display system 110 or the display device 105 may store a separate model for each eye.

Prior to determining the screen regions, the eye tracking unit 160 may perform a calibration sequence to generate or train the model of the eye. In one embodiment, the eye tracking unit 160 repeatedly scans the eye with the one or more transceivers during the calibration sequence. For example, the user is instructed to look at a certain virtual object or visual indicator displayed on the electronic display 115 of the display device 105. A portion of the eye is scanned while the user is looking at the visual indicator, allowing the eye tracking unit 160 to capture sample scans of the eye at known orientations of the eye. These sample scans may be combined into the model. After the eye tracking unit 160 generates the model, the eye tracking unit 160 may subsequently track the user's eye. In some embodiments, the eye tracking unit 160 updates the model during eye tracking.

The imaging device 135 generates slow calibration data in accordance with calibration parameters received from the display system 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the display system 110, and the imaging device 135 receives one or more calibration parameters from the display system 110 to adjust one or more imaging parameters (e.g., focal length, focus, frame rate, ISO, sensor temperature, shutter speed, aperture, etc.).

The input interface 140 is a device that allows a user to send action requests to the display system 110. An action request is a request to perform a particular action. For example, an action request may be to start an application, to end an application, or to perform a particular action within the application. The input interface 140 may include one or more input devices. Example input devices include: a keyboard, a mouse, a game controller, or any other suitable device for receiving action requests and communicating the received action requests to the display system 110. An action request received by the input interface 140 is communicated to the display system 110, which performs an action corresponding to the action request. In some embodiments, the input interface 140 provides haptic feedback to the user in accordance with instructions received from the display system 110. For example, haptic feedback is provided when an action request is received or when the input interface 140 receives instructions from the display system 110 causing the input interface 140 to generate haptic feedback when the display system 110 performs an action.

The display system 110 provides content to the display device 105 for presentation to the user in accordance with information received from one or more of: the imaging device 135, the display device 105, and the input interface 140. In the example shown in FIG. 1A, the display system 110 includes an application store 145, a tracking module 150, an engine 155, and an image processing engine 165. Some embodiments of the Display system 110 have different modules than those described in conjunction with FIG. 1A. Similarly, the functions further described below may be distributed among modules of the Display system 110 in a different manner than described here.

The application store 145 stores one or more applications for execution by the display system 110. An application is a group of instructions, that when executed by a processor, generates content for presentation to the user. Content generated by an application may be in response to inputs received from the user via movement of the display device 105 or the input interface 140. Examples of applications include: gaming applications, conferencing applications, video playback applications, or other suitable applications.

The tracking module 150 calibrates the system 100 using one or more calibration parameters and may adjust one or more calibration parameters to reduce error in determining of the position of the display device 105 or of the input interface 140. For example, the tracking module 150 adjusts the focus of the imaging device 135 to obtain a more accurate position for observed locators on the display device 105. Moreover, calibration performed by the tracking module 150 also accounts for information received from the IMU 130. Additionally, if tracking of the display device 105 is lost (e.g., the imaging device 135 loses line of sight of at least a threshold number of the locators 120 on the display device 105), the tracking module 150 re-calibrates some or all of the system 100.

The tracking module 150 tracks movements of the display device 105 using slow calibration information from the imaging device 135. For example, the tracking module 150 determines positions of a reference point of the display device 105 using observed locators from the slow calibration information and a model of the display device 105. The tracking module 150 also determines positions of a reference point of the display device 105 using position information from the fast calibration information. Additionally, in some embodiments, the tracking module 150 may use portions of the fast calibration information, the slow calibration information, or some combination thereof, to predict a future location of the display device 105. The tracking module 150 provides the estimated or predicted future position of the display device 105 to the engine 155.

The engine 155 executes applications within the system 100 and receives position information, acceleration information, velocity information, predicted future positions, or some combination thereof of the display device 105 from the tracking module 150. Based on the received information, the engine 155 determines content to provide to the display device 105 for presentation to the user. For example, if the received information indicates that the user has looked to the left, the engine 155 generates content for the display device 105 that mirrors the user's movement in a virtual environment. Additionally, the engine 155 performs an action within an application executing on the Display system 110 in response to an action request received from the input interface 140 and provides feedback to the user that the action was performed. The provided feedback may be visual or audible feedback via the display device 105 or haptic feedback via the input interface 140.

The image processing engine 165 receives eye tracking information (e.g., from the eye tracking unit 160), divides the screen into two or more screen regions representing the portions of the screen viewed by different parts of the user's retina, and processes images for display on the screen by applying a different set of parameters to the portion of the image that is to be displayed in each screen region. As referred to herein, processing an image for display on the screen may include rendering the image (e.g., rendering a scene in a game), encoding the image, or some combination of rendering and encoding the image. The components of the image processing engine 165 are described in detail below with reference to FIG. 1B.

In the embodiment shown in FIG. 1A, the image processing engine 165 is implemented in a system 100 that may operate in a VR system environment, an AR system environment, a MR system environment, or some combination thereof. However, the image processing engine 165 as described herein may also be implemented in other types of system that also include eye tracking components. For example, in another embodiment the engine 165 is implemented on a portable electronic device (e.g., a smartphone or tablet computer). In this embodiment, the engine 165 receives eye tracking information (e.g., images captured from a front-facing camera of the portable electronic device) and applies adaptive parameters to images that are displayed on the screen of the portable electronic device. In still another embodiment, the engine 165 is implemented on a laptop or desktop computer that has components capable of performing eye tracking (e.g., a user-facing camera, such as a camera built into the bezel of a laptop display or mounted on top of a monitor) and applies adaptive parameters to images that are displayed on a screen of the computer.

Figure 1B:
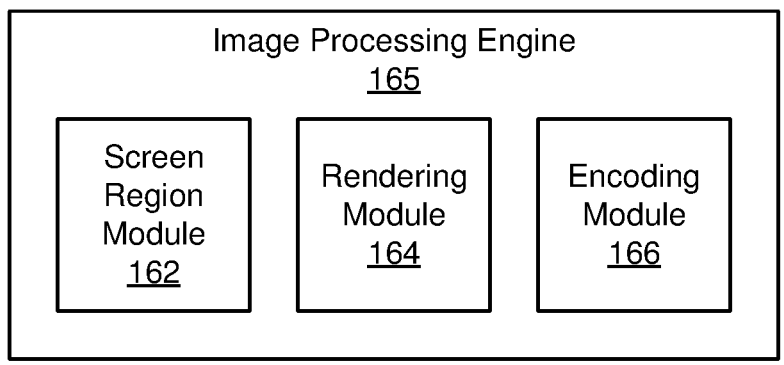
FIG. 1B is a block diagram of a rendering/encoding engine, in accordance with an embodiment.

FIG. 1B is a block diagram of the image processing engine 165, in accordance with an embodiment. The rendering/encoding engine shown in FIG. 1B includes a screen region module 162, a rendering module 164, and an encoding module 166. In alternative configurations, different and/or additional components may be included in the rendering/encoding engine. Similarly, the functionality of one or more of the components may be distributed among the components in a different manner than is described here.

The screen region module 162 receives eye tracking information (e.g., from the eye tracking unit 160) and determines screen regions corresponding to different portions of the user's retina, such as the fovea, parafovea, and the portion of the retina beyond the parafovea. As referred to herein, a screen region is a portion of the screen that is being viewed by a particular portion of the user's retina. For example, the screen region module 162 may determine a first screen region (a fovea region) corresponding to the portion of the screen being viewed by the fovea, a second screen region (a parafovea region) corresponding to the portion of the screen being viewed by the parafovea, and a third screen region (an outside region) corresponding to the portion of the screen being viewed by the portion of the retina outside the parafovea.

The screen region module 162 receives the eye tracking information from eye tracking components, such as the eye tracking unit 160. In one embodiment, the eye tracking information includes the angular orientation of the user's eye as determined by the eye tracking unit 160. In another embodiment, the eye tracking information includes additional or different information, such as one or more images of the user's eye. The manner in which the screen region module 162 determines screen regions based on the eye tracking information is described in detail below with reference to FIGS. 3A-3C.

The rendering module 164 renders images based on information generated by applications executing on the display system 110. The applications may be stored in the application store 145 or received from another system via the input interface 140. For example, the display system 110 executes a gaming application that generates a scene that includes one or more virtual objects (such as a player character, non-player characters, environmental objects, and backgrounds) in various positions within the scene. The module 164 renders images by dividing the images into two or more image regions and applying a corresponding set of rendering parameters to each region. For instance, in the example described above, the rendering module 164 renders images of the scene by rendering the virtual objects in each image region with the corresponding set of rendering parameters. As referred to herein, an image can be a still picture or one frame in a sequence of frames (e.g., a frame of a video or a game application).

The encoding module 166 receives images (e.g., from the rendering module 164 or the input interface 140) and encodes the images for transmission. The module 166 encodes images by dividing the images into two or more image regions and applying a corresponding set of encoding parameters to each region. In one embodiment, the encoding module 166 encodes images according to the process described with reference to FIGS. 6A and 6B. After they are encoded, the display system 110 may transmit the images to the display device 105 to be displayed to the user.

As referred to herein, an image region is a portion of the image that, when displayed on the screen of the display device 105, is viewed by a particular portion of the user's retina. For example, the modules 164, 166 apply different sets of parameters to a first image region that is viewed by the fovea, a second image region that is viewed by the parafovea, and a third image region that is viewed by the portion of the retina outside of the parafovea. In some embodiments, the images rendered by the rendering module 164 and/or encoded by the encoding module 166 are displayed in a manner that covers the entire screen (i.e., the images are displayed in full-screen mode). In these embodiments, the image regions described with reference to the rendering module 164 and the encoding module 166 have the same shapes and positions within the image as the screen regions described with reference to the screen region module 162. In other embodiments, the images are displayed on a portion of the screen (e.g., within a window that does not occupy the entire screen). In these embodiments, the modules 164, 166 determine the boundaries of the image regions by cropping the screen regions to include the portion of the screen on which the image is to be displayed and to exclude other portions of the screen.

Figure 2:
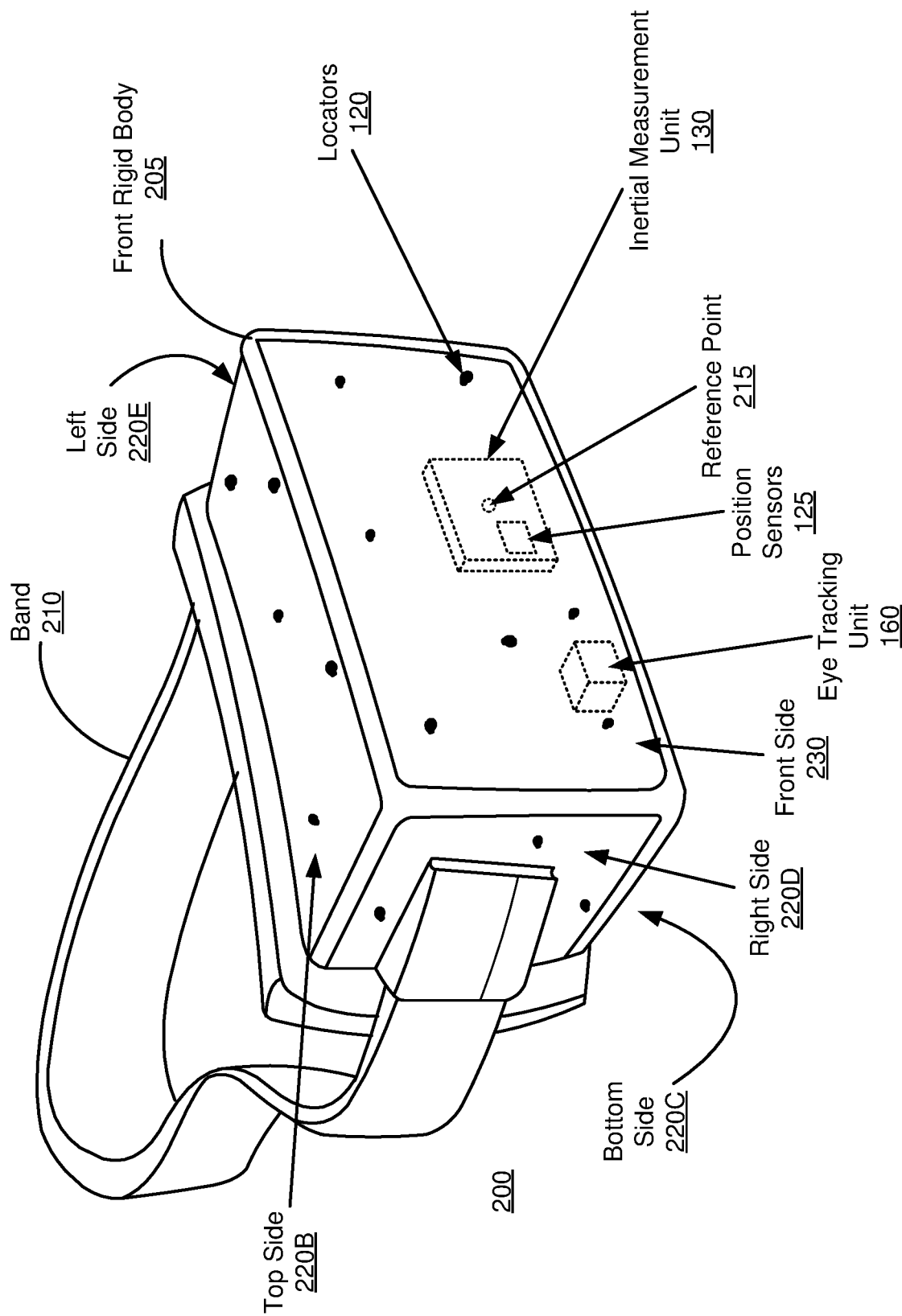
FIG. 2 is a diagram of a head-mounted display, in accordance with an embodiment.

FIG. 2 is a diagram of a head-mounted display (HMD) 200, in accordance with an embodiment. The HMD 200 is an embodiment of the display device 105, and includes a front rigid body 205 and a band 210. The front rigid body 205 includes an electronic display element of the electronic display 115 (not shown in FIG. 2), the optics block 118 (not shown in FIG. 2), the IMU 130, the one or more position sensors 125, an eye tracking unit 160, and the locators 120. In the embodiment shown by FIG. 2, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2, the reference point 215 is located at the center of the IMU 130. Each of the locators 120 emit light that is detectable by the imaging device 135. The locators 120, or portions of the locators 120, are located on a front side 220A, a top side 220B, a bottom side 220C, a right side 220D, and a left side 220E of the front rigid body 205 in the example of FIG. 2.

Adaptive Parameters in Image Regions

Figure 3A:
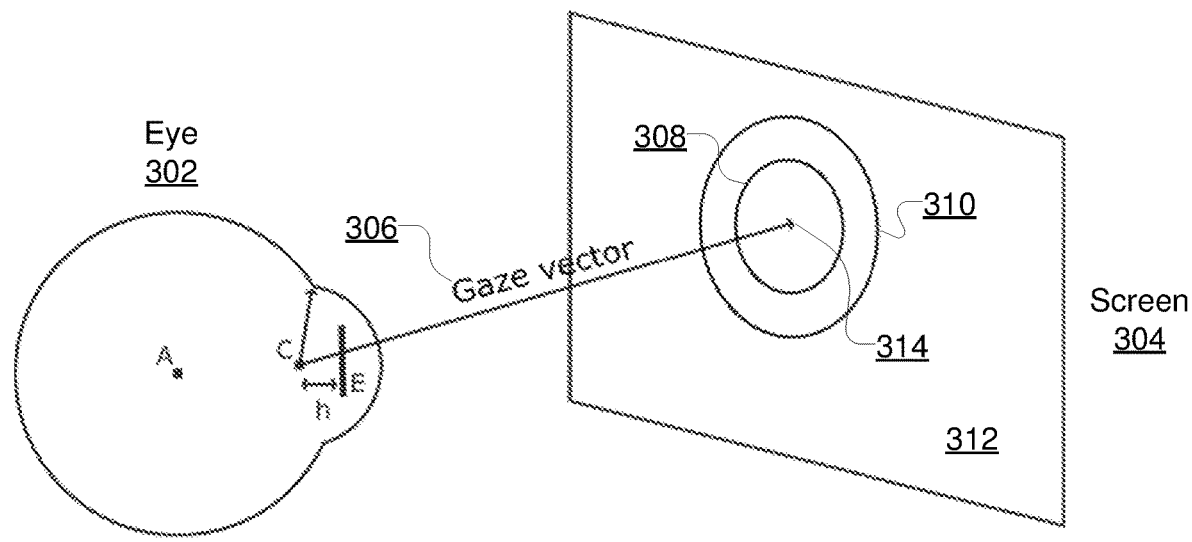
FIGS. 3A and 3B illustrate an eye gazing at a screen and depict a fovea region and a parafovea region, as well as a fovea cone and a parafovea cone, in accordance with an embodiment.
Figure 3B:
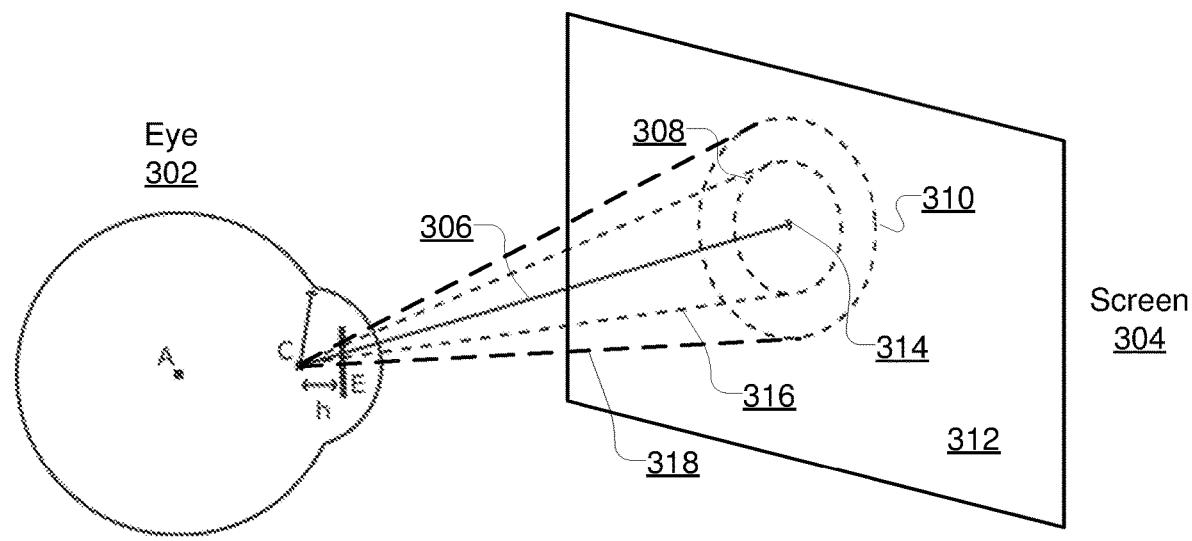

FIGS. 3A and 3B illustrate a user's eye 302 gazing at a screen 304 in a direction indicated by a gaze vector 306, in accordance with an embodiment. Referring first to FIG. 3A, illustrated is the user's eye 302, the gaze vector 306, and the screen 304. FIG. 3A further illustrates a fovea region 308, a parafovea region 310, and an outside region 312 on the screen that have been generated by the screen region module 162 based on images of the eye captured, for example, by the eye tracking unit 160.

The screen region module 162 determines a gaze vector representing the direction in which the eye is looking. In some embodiments, the screen region module 162 determines the gaze vector based on a plurality of eye characteristics associated with the eye, including an eyeball center (A), a cornea center (C), a pupil (E), and a distance between cornea center and pupil center (h). In one embodiment, the eye tracking unit 160 calculates estimates of these eye characteristics and sends the estimates to the screen region module 162 as part of the eye tracking information. In another embodiment, the screen region module 162 receives the angular orientation of the eye from the eye tracking unit 160 and generates these eye characteristics by applying a rotation to a model of the eye based on the angular rotation. In other embodiments, the screen region module 162 receives the foveal axis of the eye from the eye tracking unit 160 and uses the direction of the foveal axis as the gaze vector 306. After determining the gaze vector 306, the module 162 determines the point of regard 314 by computing an intersection between the gaze vector 306 and the screen 304. In other embodiments, the point of regard 314 is computed by other means.

The region of the screen depicted as 302 is the fovea region where the eye would be most sensitive to differences in resolution. The region depicted as 304 is the parafovea region, closest to 302, where the eye is less sensitive to differences in resolution. The area outside regions 302 and 304 is the outside image region 306, where the eye is least sensitive to difference in resolution.

In the embodiment shown in FIG. 3A, the screen region module 162 determines the fovea region 308 by drawing a circle of a predetermined radius centered on the point of regard. Similarly, the screen region module 162 determines the parafovea region 310 by drawing a second circle of a second predetermined radius centered on the point of regard and subtracting the foveal region to yield an annulus (a ring shape). The screen region module 162 may additionally determine the outside region 312 as the region of the screen not covered by the fovea region 308 and the parafovea region 310.

This process for determining the screen regions 308, 310, 312 with predetermined radii is particularly advantageous in an implementation where the screen 304 remains at a known distance from the user's eye 302 during operation (e.g., an implementation where the display device 105 is a head mounted display, such as the HMD 200 shown in FIG. 2) because, for example, the predetermined radii may be selected to correspond to a particular number of degrees of visual angle, and the degrees of visual angle for the fovea region 308 and parafovea region 310 can be selected to represent estimates of the anatomical boundaries of the user's fovea and parafovea. For instance, as noted above, the predetermined radii may be selected so that the fovea region 308 corresponds to a radius of 2.5 degrees of visual angle and the parafovea region 310 corresponds to a radius of 5.0 degrees of visual angle. In some embodiments, the predetermined radii are selected based on the model of the user's eye that is described above with reference to the eye tracking unit 160.

FIG. 3B illustrates the eye of FIG. 3A and further depicts a fovea cone 316 and a parafovea cone 318, in accordance with an embodiment. In the embodiment shown in FIG. 3B, the fovea region and the parafovea region are defined by 3D cones. The conical shape depicted as 316 is the fovea cone, whereas the conical shape depicted as 318 is the parafovea cone.

In the embodiment shown in FIG. 3B, the screen region module 162 determines the screen regions 308, 310 based on the cones 316, 318. More particularly, the screen region module 162 determines the gaze vector based on eye characteristics in the manner described above with reference to FIG. 3A. After determining the gaze vector 306, the screen region module 162 defines the fovea cone 316 as a cone having axis that matches the gaze vector 306, an apex at the cornea center (C), and a conical surface that is offset by a predetermined angle (e.g., 2.5 degrees) relative to the axis. Similarly, the screen region module 162 defines the parafovea cone 318 as a cone having axis that matches the gaze vector 306, an apex at the cornea center (C), and a conical surface that is offset by a different predetermined angle (e.g., 5 degrees) relative to the axis. Similar to the predetermined radii described above with reference to FIG. 3A, the predetermined angles that define the cones 316, 318 can be selected to represent estimates of the anatomical boundaries of a typical human user's fovea and parafovea and may be based on a model of the eye. After defining the cones 316, 318, the screen region module 162 determines the foveal region 308 and the parafovea region 310 by computing intersections between the corresponding cones 316, 318 and the screen 304. The screen region module 162 may further determine the outside region 312 as the region of the screen not covered by the fovea region 308 and the parafovea region 310.

Figure 3C:
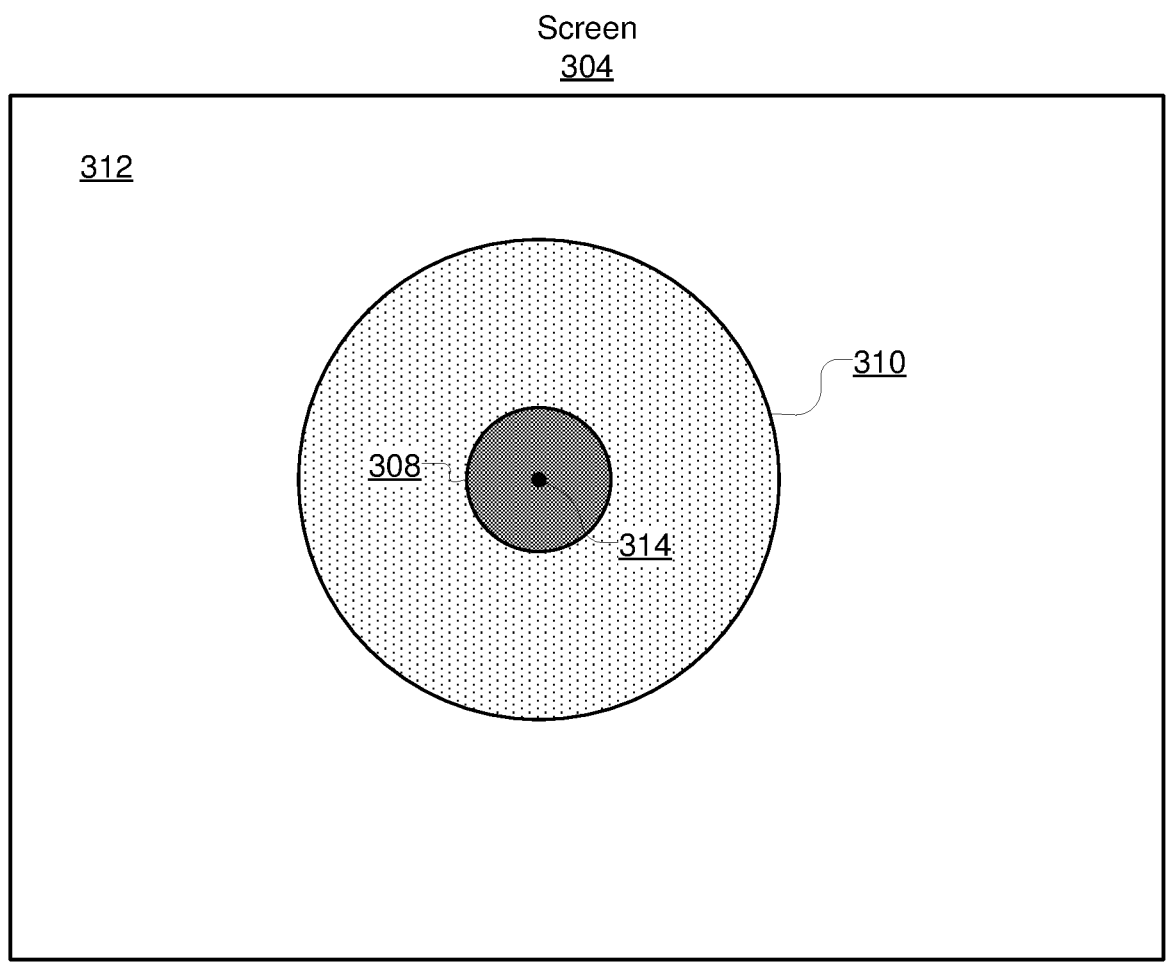
FIG. 3C illustrates a fovea region, a parafovea region, and an outside region on a screen, in accordance with an embodiment.

FIG. 3C illustrates a fovea region 308, a parafovea region 310, and an outside region 312 as they appear on the screen 304, in accordance with an embodiment. Although the fovea and parafovea regions 308, 310 are shown in FIGS. 3A-3C as circles, in other embodiments these regions can have a different shape. In one embodiment, the fovea and parafovea regions are squares that are centered on the point of regard 314 and whose sides have the same length as the diameter as the circular fovea and parafovea regions 308, 310 shown in FIGS. 3A-3C. In another embodiment, the fovea and parafovea regions are rectangles. It is advantageous to use square or rectangular fovea and parafovea regions because, for example, it is easier to define a square or rectangular region on a screen whose pixels are indexed with a rectangular coordinate system.

In some embodiments, the screen region module 162 generates additional regions to provide a smoother transition between layers. In some embodiments, the size of each region is adaptive and may be updated based on noise in the eye characteristics, estimated accuracy of the eye characteristics, direction of the gaze vectors, or any combination thereof. In some embodiments, the size of each screen region is increased when a saccade (a rapid eye movement between fixation points) is detected, and reduced again once a fixation is stable.

Figure 4:
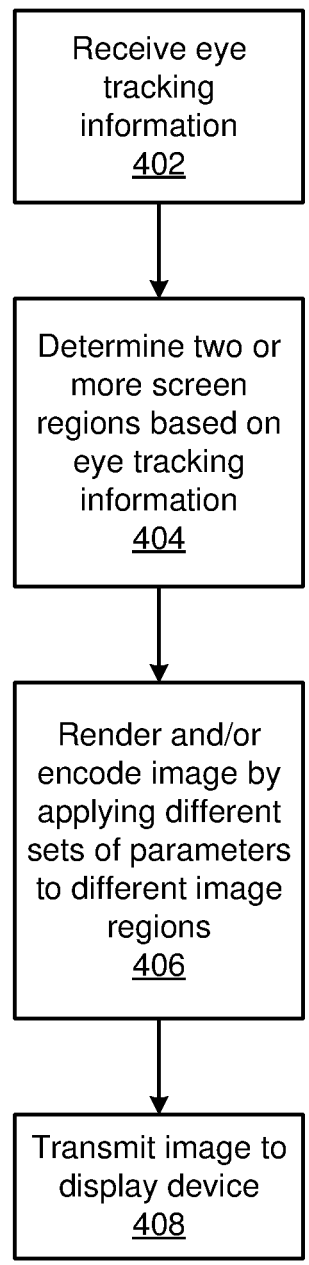
FIG. 4 is a block diagram illustrating a process for applying adaptive parameters in image regions based on eye tracking information, in accordance with an embodiment.

FIG. 4 is a block diagram illustrating a process for applying adaptive parameters in image regions based on eye tracking information, in accordance with an embodiment. The display system 110 receives 402 eye tracking information. For example, the system 110 receives an angular orientation of the user's eye from the eye tracking unit 160 of the display device 105. The system 110 additionally or alternatively receives other types of eye tracking information, such as images of the user's eye or one or more of the eye characteristics described with reference to FIG. 3A.

After receiving 402 the eye tracking information, the system 110 determines 404 two or more screen regions based on the eye tracking information. For example, the system 110 performs one or both of the processes described with reference to FIGS. 3A and 3B to determine 404 a fovea region, a parafovea region, and an outside region. In other embodiments, the system 110 may determine 404 a different number of regions. For example, the system 110 may determine two regions (e.g., a fovea region and an outside region, but not a parafovea region). As another example, the system may determine a fovea region, parafovea region, and outside region as described above, and additionally determine a perifovea region corresponding to the perifovea of the user's eye (a portion of the retina that circumscribes the parafovea).

The system 110 renders and/or encodes an image by applying 406 different sets of parameters to different image regions within the image. In embodiments where the image is to be displayed on the entire screen, the image regions are coextensive with the screen regions. In embodiments where the image is to be displayed on a portion of the screen, the system 110 determines the boundaries of the image regions by cropping the screen regions to the portion of the screen on which the image is to be displayed. The display system 110 transmits 408 the image to the display device 105 to be displayed on the screen.

Figure 5A:
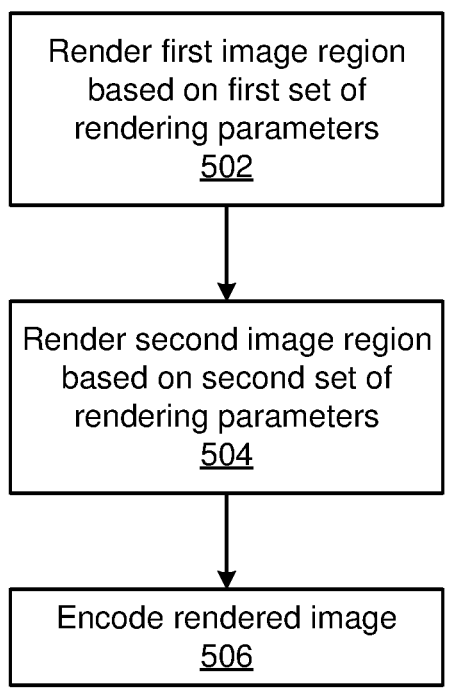
FIG. 5A is a block diagram illustrating a process for rendering different portions of an image with different sets of rendering parameters, in accordance with an embodiment.
Figure 5B:
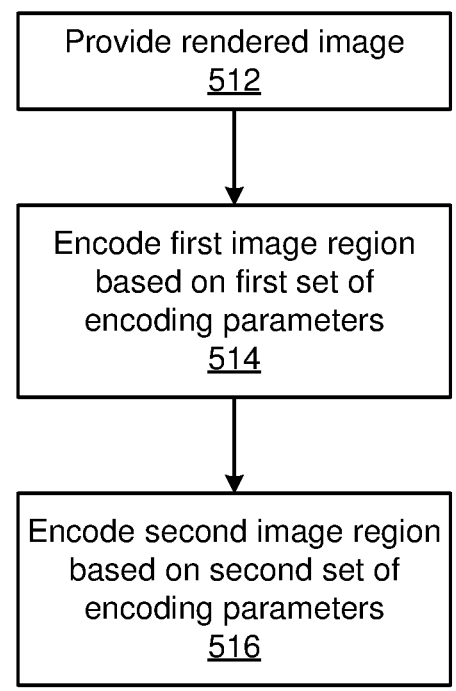
FIG. 5B is a block diagram illustrating a process for encoding different portions of an image with different sets of encoding parameters, in accordance with an embodiment.
Figure 5C:
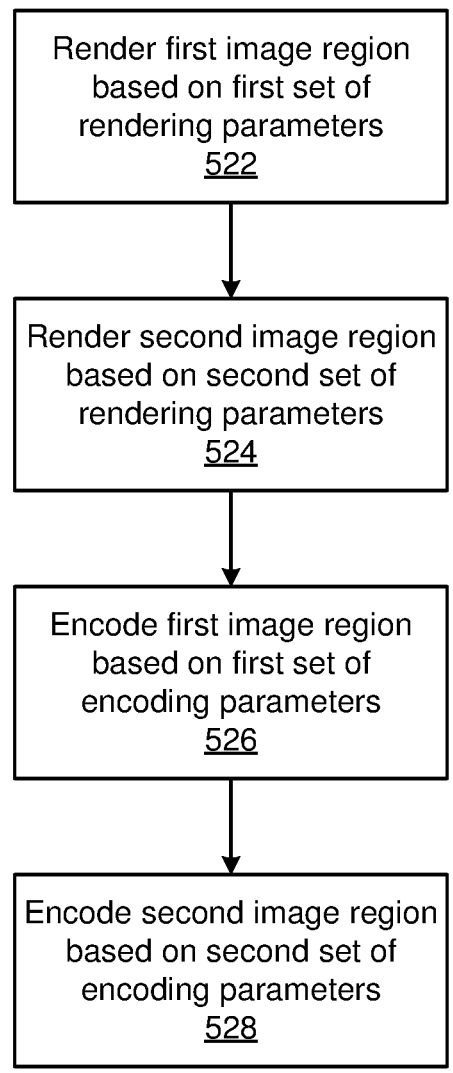
FIG. 5C is a block diagram illustrating a process for rendering and encoding different portions of an image with different sets of parameters, in accordance with an embodiment.

FIGS. 5A-5C illustrate various embodiments of a process for rendering and encoding an image by applying different sets of parameters to different image regions. One or more of the processes shown in FIGS. 5A-5C may be performed, for example, as the rendering/encoding step 406 described with reference to FIG. 4. In one embodiment, each of the processes shown in FIGS. 5A-5C are performed by the image processing engine 165.

Referring first to FIG. 5A, illustrated is a block diagram illustrating a process for rendering different portions of an image with different sets of rendering parameters, in accordance with an embodiment. The display system 110 renders 502 a first image region based on a first set of rendering parameters. The display system 110 also renders a second image region based on a second set of rendering parameters. For example, the first image region may be a fovea region corresponding to the portion of the image viewed by the fovea, and the second image region may be an outside region corresponding to the portion of the image viewed by the portion of the retina outside the fovea.

As referred to herein, a set of rendering parameters specifies one or more factors that affect the operation of a rendering process that is performed on the display system 110 to render images. Examples of rendering parameters may include image resolution, framerate, anti-aliasing settings, or texture quality. Some or all of the rendering parameters may be adjusted to either achieve higher image quality at the expense of making the rendering process consume more computing resources, or lower quality but allowing the rendering process to be performed with less computing resources. In one embodiment, the second set of rendering parameters yields a lower image quality than the first set of rendering parameters.

After the image is rendered, the display system 110 encodes 506 the rendered image. In the embodiment shown in FIG. 5A, the entire image is encoded 506 based on a single set of encoding parameters. However, in other embodiments, such as the embodiments shown in FIGS. 5B-5C, the display system 110 encodes 506 different regions of the rendered image based on different sets of encoding parameters.

Although not shown in FIG. 5A, the display system 110 may also render a third image region based on a third set of rendering parameters. In one embodiment, the third image region may be a parafovea region corresponding the portion of the image viewed by the parafovea (in this case, the outside region may correspond to the portion of the image viewed by the portion of the retina outside both the fovea and parafovea). In this embodiment, the third set of rendering parameters yields an intermediate level of image quality (i.e., lower image quality that the first set of rendering parameters and higher image quality than the second set of rendering parameters).

More broadly, the display system 110 can render the fovea region, parafovea region, and outside region (referred to as the first, third, and second regions, respectively, in the description provided above) with different sets of rendering parameters that provide for decreasing levels of image quality. Because the eye's sensitivity to image quality decreases with distance from the fovea, the intermediate image quality in the parafovea region and the lower image quality in the outside region are imperceptible to many users. However, the use of lower-quality rendering parameters for the parafovea and outside regions allows the rendering process for the image to be performed with fewer computing resources, which advantageously allows the rendering process to be completed in less time and/or consume less power. Thus, this process of rendering different image regions with different sets of rendering parameters allows the display system 110 to perform a rendering process that strikes a balance between sufficiently high image quality and lower use of computing resources.

In some embodiments, the image being rendered depicts a scene generated by an application (e.g., a game) and includes multiple objects at various positions within the scene. In one embodiment, a set of rendering parameters may be applied to objects in the scene based on whether a portion of the object appears inside the corresponding region. For example, if the user is looking at an object and a portion of the object extends outside of the fovea region, the display system 110 may assign render the entire object with the first set of rendering parameters so that the user does not perceive any change in quality in some portions of the object.

In some embodiments, one or more of the objects in the scene has a depth value representing a distance between the object and the user. The depth value of each object in the scene may be determined by the application that generates the scene. For example, the depth value for an object in a scene generated by a game application may represent the distance between the position of the game object in the scene and the position of the player's point of view.

In these embodiments, the display system 110 may select the set of rendering parameters to apply to an object based at least in part on the object's depth. In one embodiment, if a user is looking at an object located at a short distance (e.g., if the point of regard is positioned on an object having a depth value lower than a first threshold value), the display system 110 applies a lower-quality set of rendering parameters to objects located in the background (e.g., objects having a depth value higher than a second threshold value), even if the background objects are within the fovea or parafovea regions.

In another embodiment, two gaze vectors are separately determined for the user's two eyes, and the display system 110 determines the user's depth of focus based on the convergence of the two gaze vectors. In this embodiment, the display system 110 determines a difference in depth between the depth of focus and the depth values of objects in the scene (hereinafter referred to as a depth difference), and the system 110 applies a lower-quality set of rendering parameters to objects whose depth difference is above a threshold value, even if those objects are in the fovea or parafovea regions.

In some embodiments, the display system 110 performs the rendering process for multiple images that together make up a sequence of frames. For example, the image may be frames of a video or frames of a game application. In these embodiments, the display system 110 may render different regions of the image at different framerates. In one embodiment, the display system 110 renders fovea region for every frame and renders the outside region every other frame. In some embodiments, the display system 110 may apply temporal antialiasing in order to correct the region that has not been rendered for a given frame.

In another embodiment, the display system 110 determines the frequency at which an image region in a frame is rendered based on the content of the scene. For instance, if an image region contains objects that remain somewhat static between consecutive frames (e.g. clouds in the background), the image region may be rendered at a lower frequency than an image region that contains moving objects.

FIG. 5B is a block diagram illustrating a process for encoding different portions of an image with different sets of encoding parameters, in accordance with an embodiment. A rendered image is provided 512 at the display system 110. In various embodiments, the rendered image may be rendered on the display system 110 (e.g., as part of a game application or some other application executing on the display system), stored in a storage medium of the display system 110 (e.g., an image file or a video file), or received at the display system 110 over the input interface 140 (e.g., a video stream from a streaming service such as YOUTUBE).

After the rendered image is provided 512, the display system 110 encodes 514 a first image region based on a first set of encoding parameters. The display system 110 also encodes 516 a second image region based on a second set of encoding parameters. For example, the first image region may be a fovea region corresponding to the portion of the image viewed by the fovea, and the second image region may be an outside region corresponding to the portion of the image viewed by the portion of the retina outside the fovea.

As referred to herein, a set of encoding parameters specifies one or more factors that affect the operation of an encoding process that is performed on the display system 110 to render the image. Examples of encoding parameters may include image resolution, framerate, and compression factors such as the type of transform used for transform coding, the number and ranges of quantization levels, chroma subsampling, and color space reduction. Similar to the rendering parameters described above, some or all of the encoding parameters may be adjusted to either achieve higher image quality at the expense of making the encoding process consume more computing resources, or lower quality but allowing the encoding process to be performed with less computing resources. In addition, a higher-quality set of encoding parameters may result in an encoded image file with a larger file size, while a lower-quality set of encoding parameters may result in an encoded image file with a smaller file size. In one embodiment, the second set of rendering parameters yields a lower image quality and a lower file size than the first set of rendering parameters.

Although not shown in FIG. 5B, the display system 110 may also encode a third image region based on a third set of encoding parameters. In one embodiment, the third image region may be a parafovea region corresponding the portion of the image viewed by the parafovea (in this case, the outside region may correspond to the portion of the image viewed by the portion of the retina outside both the fovea and parafovea). In this embodiment, the third set of rendering parameters yields an intermediate level of image quality (i.e., lower image quality that the first set of encoding parameters and higher image quality than the second set of encoding parameters).

In sum, a display system 110 that performs this process for encoding an image can apply higher-quality encoding parameters to the fovea region, intermediate-quality encoding parameters to the parafovea region, and lower-quality encoding parameters to the outside region. As noted above, the eye's sensitivity to image quality decreases with distance from the fovea; thus, the intermediate quality in the parafovea region and the lower quality in the outside region are less likely to adversely image the user's perception of the image's overall image quality. However, the use of the intermediate- and lower-quality encoding parameters in the parafovea and outside regions allow the encoding process to be performed with fewer computing resources, so the encoding process can be completed in less time and/or consume less power. Furthermore, the use of the intermediate- and lower-quality encoding parameters in the parafovea and outside regions result in an encoded image with a smaller file size, which advantageously reduces the amount of bandwidth used when transmitting the image to the display device 105.

FIG. 5C is a block diagram illustrating a process for rendering and encoding different portions of an image with different sets of parameters, in accordance with an embodiment. The display system 110 renders 522 a first image region based on a first set of rendering parameters and renders 524 a second image region based on a second set of rendering parameters. After rendering the image, the display system 110 encodes 526 a first image region based on a first set of encoding parameters and encodes 528 a second image region based on a second set of encoding parameters.

In one embodiment, the image regions used for the rendering steps 522, 524 are the same as the image regions used for the encoding steps 526, 528. In other words, the first set of encoding parameters is applied to the image region that was rendered with the first set of rendering parameters, and the second set of encoding parameters is applied to the image region that was rendered with the second set of rendering parameters. In other embodiments, the image regions used for the rendering steps 522, 524 are different from the image regions used for the encoding steps 526, 528. For example, the image regions used for the rendering steps 522, 524 are be circular, while the image regions used for the encoding steps 526, 528 are square (as shown in the examples described below with reference to FIGS. 6A and 6B).

Figure 6A:
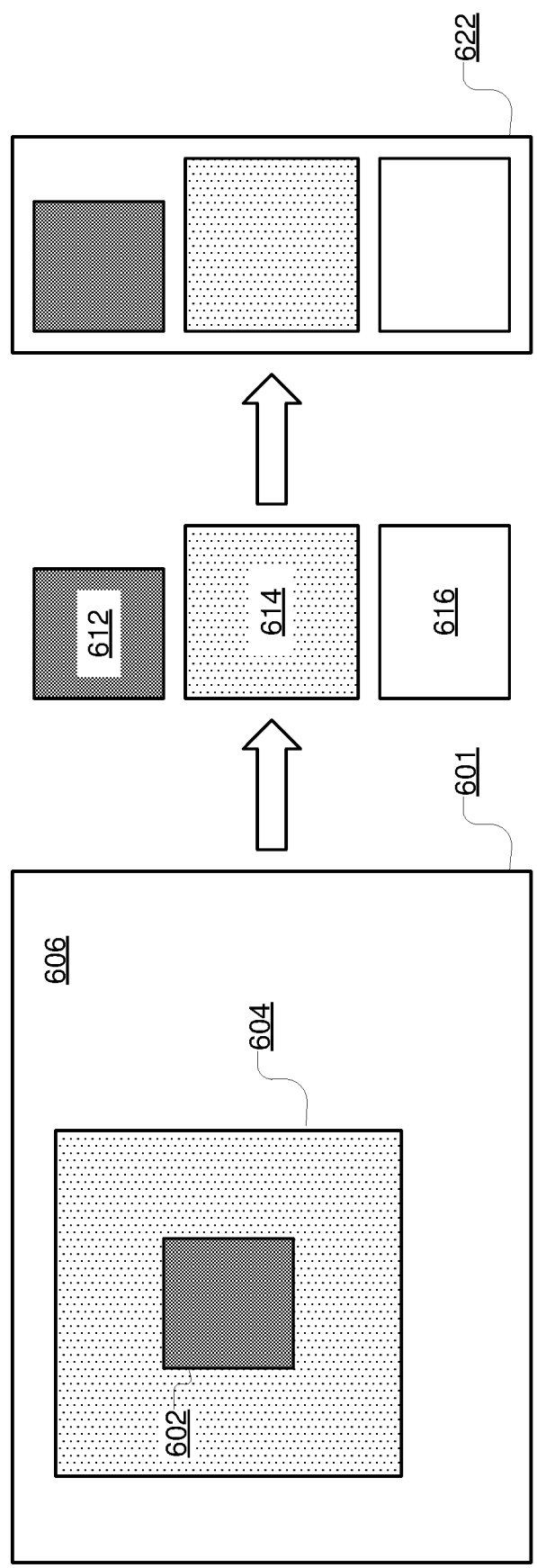
FIG. 6A illustrates an example of encoding different regions of an image with different sets of encoding parameters and then packing the encoded image regions for an image into a packed image, in accordance with an embodiment.

FIG. 6A illustrates an example of a process for encoding different regions of an image with different sets of encoding parameters and then packing the image regions for an image into a single frame, in accordance with an embodiment. The display system 110 encodes an image 601 that has been divided into a fovea region 602, a parafovea region 604, and an outside region 606. The display system 110 encodes the fovea region 602 based on a first set of encoding parameters, encodes the parafovea region 604 based on a second set of rendering parameters, and encodes the outside region based on a third set of rendering parameters. In the example shown in FIG. 6A, the three sets of encoding parameters specify different resolutions. In particular, the first set of encoding parameters specifies a first, relatively high resolution, the second set of encoding parameters specifies a lower resolution (e.g. one-half of the first resolution), and the third set of encoding parameters specifies an even lower resolution (e.g. one-fourth of the first resolution).

This encoding process generates three encoded image regions: an encoded fovea region 612, an encoded parafovea region 614, and an encoded outside region 616. The display system 110 performs a packing process to pack the encoded image regions together into a single packed image 622 and transmits the packed image 622 to the display device 105. After receiving the packed image 622, the display device 105 unpacks and reconstructs the image 601 by upscaling and compositing each encoded image region accordingly in order to display it on the screen. Packing the encoded image regions in this manner is advantageous because, for example, the resulting packed image 622 contains considerably fewer pixels than an image at a particular resolution. For example, if the image 601 has a resolution of 1920 by 1080 pixels, the packed image 622 includes 0.380 million pixels versus 2.0 million pixels for the original 1920 by 1080 image, which significantly reduces the bandwidth and time used to transmit each image.

Figure 6B:
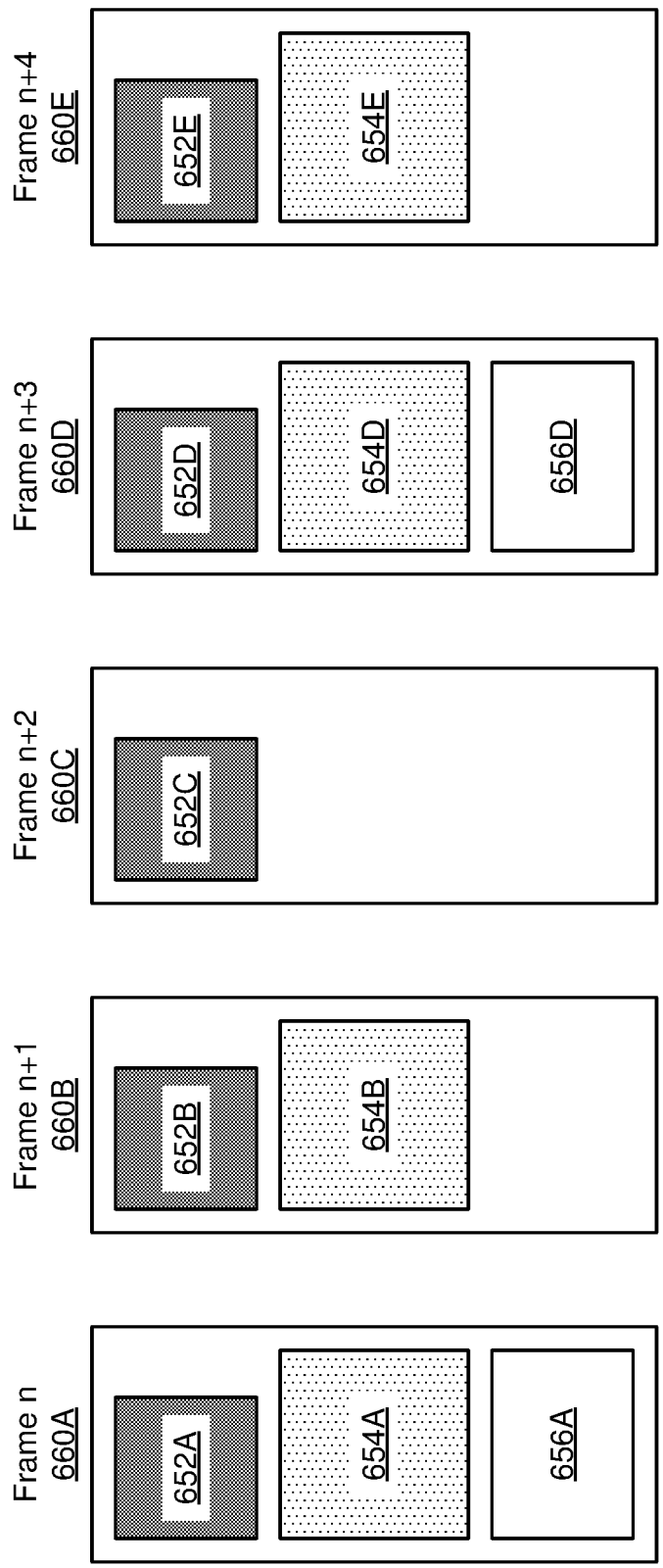
FIG. 6B illustrates an example of encoding and packing a sequence of images, in accordance with an embodiment.

FIG. 6B illustrates an example of encoding and packing a sequence of images, in accordance with an embodiment. In the example shown in FIG. 6B, the sequence of images makes up a sequence of frames (e.g., in a video or a game application), and each set of encoding parameters specifies a different frequency (i.e., a different framerate). More particularly, the fovea region 652 is encoded and transmitted at a first frequency (e.g., 120 Hz); the parafovea region 654 is encoded and transmitted at a second frequency that is lower than the first frequency (e.g., 80 Hz); and the outside region 656 is encoded and transmitted at a third frequency that is lower than the first and second frequencies (e.g., 40 Hz).

For each frame, the display system 110 encodes and packs the image regions into a packed frame that is then transmitted to the display device 105. When a frame does not contain all the regions (e.g., frame n+1 660B, frame n+2 660C, and frame n+4 660E), the display system 110 generates the next frame by using the most recent frame available for each image region. In some embodiments, post-processing techniques are applied in order to correct for misalignments.

FIG. 6B shows a sequence of five frames, frame n 660A to frame n+4 660E. Frame n includes a fovea region 652A, a parafovea region 654A, and an outside region 656A. In frame n+1 660B, the fovea region 652B and parafovea region 654B are included, but the outside region is not included, thus reducing the amount of data to be transmitted to the display device 105. Frame n+2 includes a newly encoded fovea region 652C but does not include a parafovea region or an outside region, thus further reducing the amount of data. Then the sequence repeats itself with frame n+3 660D and frame n+4 660E. In so doing, the image region to which the user's eye is most sensitive (i.e., the fovea region 652) is encoded and transmitted anew with each successive frame. The image region to which the user's eye is less sensitive (i.e., the parafovea region 654) is encoded and transmitted anew each two out of three frames. And the image region to which the user's eye is even less sensitive (i.e., the outside region) is encoded and transmitted anew once every three frames. This significantly reduces the amount of data conveyed and thus the bandwidth and time required to transmit each frame.

In some embodiments, the display system 110 does not render the regions that are not encoded and transmitted to the display device 105 for a given frame. In some embodiments, the display system 110 determines which regions are to be rendered based on the activity in the scene. For instance, if objects remain static in an image region, the rendering frequency for that image region may be lower than when moving objects are present.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   determining a plurality of screen regions of a screen of a display device, the plurality of screen regions comprising a first screen region separate from a second screen region, the first screen region containing a point of regard of a user, and wherein the second screen region surrounds the first screen region;
   encoding a portion of an image corresponding to the first screen region to be displayed on the screen with a first set of encoding parameters, the portion of the image to include an object;
   encoding another portion of the image corresponding to the second screen region with a second set of encoding parameters, the second set of encoding parameters resulting in a lower quality than the first set of encoding parameters;
   determining a location of eye convergence of a user based in part on a convergence of two gaze vectors, one gaze vector for each eye of the user;
   determining a depth of the object in the image;
   determining a difference between the location of eye convergence of the user and the depth of the object;
   encoding the object with the second set of parameters based in part on the difference; and
   transmitting the encoded image to the display device to be displayed on the screen.

2. The method of claim 1, wherein the first screen region is a circle centered on the point of regard, and the second screen region is an annulus centered around the point of regard.

3. The method of claim 2, wherein a size of the first screen region and a size of the second screen region are based on one or more parameters, the one or more parameters comprise:
   a radius of the first screen region, and
   a radius of an outer circle of the annulus, the outer circle corresponding to an outer edge of the second screen region.

4. The method of claim 1, wherein
   the first screen region is determined based on an intersection of a first cone with the screen of the display device, and
   the second screen region is determined based on an intersection of a second cone with the screen of the display device.

5. The method of claim 4, wherein a size of the first screen region and a size of the second screen region are based on one or more parameters, the one or more parameters comprise:
   a first angle of the first cone, wherein a conical surface of the first cone is offset from an axis by the first angle, and
   a second angle of the second cone, wherein a conical surface of the second cone is offset from the axis by the second angle.

6. The method of claim 4, further comprising determining a gaze vector for each eye of the user based on eye characteristics of the user, wherein an axis of the first cone is defined by the determined gaze vector of one eye of the user and an axis of the second cone is defined by the determined gaze vector of another eye of the user.

7. The method of claim 1, wherein the first screen region is a rectangle centered on the point of regard, and a shape of the second screen region is defined by an outer rectangle centered on the point of regard, and wherein a size of the first screen region and a size of the second screen region are based on one or more parameters, the one or more parameters comprise:
   a length of the first screen region, and
   a length of a side of the outer rectangle that defines the shape of the second screen region.

8. The method of claim 7, wherein each side of the first screen region has a same length, and each side of the outer rectangle has a same length.

9. The method of claim 1, further comprising:
   determining one or more additional screen regions, the one or more additional screen regions configured to provide a smoother transition between the first screen region and the second screen region; and
   updating a size of the first screen region, the second screen region, and the one or more additional screen regions based on at least one of a noise in eye characteristics and an estimated accuracy of the eye characteristics.

10. The method of claim 9, further comprising:
    responsive to detecting a rapid eye movement between fixation points, increasing the size of each of the first screen region, the second screen region, and the one or more additional screen regions; and
    responsive to detecting that a fixation is stable after detecting the rapid eye movement, reducing the size of each of the first screen region, the second screen region, and the one or more additional screen regions.

11. The method of claim 1, wherein the first screen region corresponds to a region of the screen viewed by a fovea of an eye of the user, and the second screen region corresponds to a region of the screen viewed by a parafovea of an eye of the user.

12. The method of claim 1, wherein the first set of encoding parameters comprises a first image resolution, the second set of encoding parameters comprises a second image resolution, and the first image resolution is higher than the second image resolution.

13. The method of claim 1, wherein the first set of encoding parameters comprises a first framerate, the second set of encoding parameters comprises a second framerate, and the first framerate is higher than the second framerate.

14. A non-transitory computer-readable medium storing instructions that, when executed by one or more processors, cause the one or more processors to perform operations comprising:

determining a plurality of screen regions of a screen of a display device, the plurality of screen regions comprising a first screen region separate from a second screen region, the first screen region containing a point of regard of a user, and wherein the second screen region surrounds the first screen region;

encoding a portion of an image corresponding to the first screen region to be displayed on the screen with a first set of encoding parameters, the portion of the image to include an object;

encoding another portion of the image corresponding to the second screen region with a second set of encoding parameters, the second set of encoding parameters resulting in a lower quality than the first set of encoding parameters;

determining a location of eye convergence of a user based in part on a convergence of two gaze vectors, one gaze vector for each eye of the user;

determining a depth of the object in the image;

determining a difference between the location of eye convergence of the user and the depth of the object;

encoding the object with the second set of parameters based in part on the difference; and transmitting the encoded image to the display device to be displayed on the screen.

15. The non-transitory computer-readable medium of claim 14, wherein the first screen region corresponds to a region of the screen viewed by a fovea of an eye of the user, and the second screen region corresponds to a region of the screen viewed by a parafovea of an eye of the user.

16. The non-transitory computer-readable medium of claim 14, wherein the first set of encoding parameters comprises a first image resolution, the second set of encoding parameters comprises a second image resolution, and the first image resolution is higher than the second image resolution.

17. The non-transitory computer-readable medium of claim 14, wherein the first set of encoding parameters comprises a first framerate, the second set of encoding parameters comprises a second framerate, and the first framerate is higher than the second framerate.

18. The non-transitory computer-readable medium of claim 14, wherein the first screen region is a circle centered on the point of regard, and the second screen region is an annulus centered around the point of regard.

19. The non-transitory computer-readable medium of claim 14, wherein
the first screen region is determined based on an intersection of a first cone with the screen of the display device, and
the second screen region is determined based on an intersection of a second cone with the screen of the display device.

20. A system comprising:
one or more processors; and
a non-transitory computer-readable medium storing instructions that, when executed by the one or more processors, cause the one or more processors to perform operations comprising:
determining a plurality of screen regions of a screen of a display device, the plurality of screen regions comprising a first screen region separate from a second screen region, the first screen region containing a point of regard of a user, and wherein the second screen region surrounds the first screen region;
encoding a portion of an image corresponding to the first screen region to be displayed on the screen with a first set of encoding parameters, the portion of the image to include an object;
encoding another portion of the image corresponding to the second screen region with a second set of encoding parameters, the second set of encoding parameters resulting in a lower quality than the first set of encoding parameters;
determining a location of eye convergence of a user based in part on a convergence of two gaze vectors, one gaze vector for each eye of the user;
determining a depth of the object in the image;
determining a difference between the location of eye convergence of the user and the depth of the object;
encoding the object with the second set of parameters based in part on the difference; and
transmitting the encoded image to the display device to be displayed on the screen.

* * * * *